(12) United States Patent
Wehrli

(10) Patent No.: US 10,376,860 B2
(45) Date of Patent: Aug. 13, 2019

(54) PACKING LAYER FOR STRUCTURED PACKING

(71) Applicant: Sulzer Chemtech AG, Winterthur (CH)

(72) Inventor: Marc Wehrli, Brütten (CH)

(73) Assignee: Sulzer Chemtech AG, Winterthur (CH)

( * ) Notice: Subject to any disclaimer, the term of this patent is extended or adjusted under 35 U.S.C. 154(b) by 204 days.

(21) Appl. No.: 14/894,723

(22) PCT Filed: May 30, 2014

(86) PCT No.: PCT/EP2014/061235
§ 371 (c)(1),
(2) Date: Nov. 30, 2015

(87) PCT Pub. No.: WO2014/195233
PCT Pub. Date: Dec. 11, 2014

(65) Prior Publication Data
US 2016/0121297 A1   May 5, 2016

(30) Foreign Application Priority Data

Jun. 7, 2013   (EP) ..................................... 13170966

(51) Int. Cl.
*B01J 19/32*   (2006.01)
*F28F 25/08*   (2006.01)

(52) U.S. Cl.
CPC ............. *B01J 19/32* (2013.01); *F28F 25/087* (2013.01); *B01J 2219/3221* (2013.01);
(Continued)

(58) Field of Classification Search
CPC ................ B01J 19/32; B01J 2219/3221; B01J 2219/32213; B01J 2219/32227; B01J 2219/32237; B01J 2219/32251; B01J 2219/32408; B01J 2219/32425; B01J 2219/32483; B01J 2219/32248; F28F 25/087
(Continued)

(56) References Cited

U.S. PATENT DOCUMENTS 3,281,307 A * 10/1966 Moeller ................... B01J 19/32
                                                     261/110
4,186,159 A    1/1980 Huber
(Continued)

FOREIGN PATENT DOCUMENTS

DE   1253673 B   11/1967
DE   2601890 A1   7/1977
(Continued)

*Primary Examiner* — Charles S Bushey
(74) *Attorney, Agent, or Firm* — Larson & Anderson, LLC

(57) ABSTRACT

The invention relates to a packing layer (1) for structured packing (20), the packing layer (1) having a plurality of structural elements (2), and the structural elements (2) being shaped and arranged in such a manner that they form a first fine structure (3), and adjacent structural elements (2) having a first spacing (a), the packing layer (1) having a plurality of protrusions (4) that are shaped and arranged in such a manner that they form a second fine structure (5), and adjacent protrusions (4) having a second spacing (b). According to the invention, the structural elements (2) and the protrusions (4) are formed without perforations.

16 Claims, 10 Drawing Sheets

Figure 1:
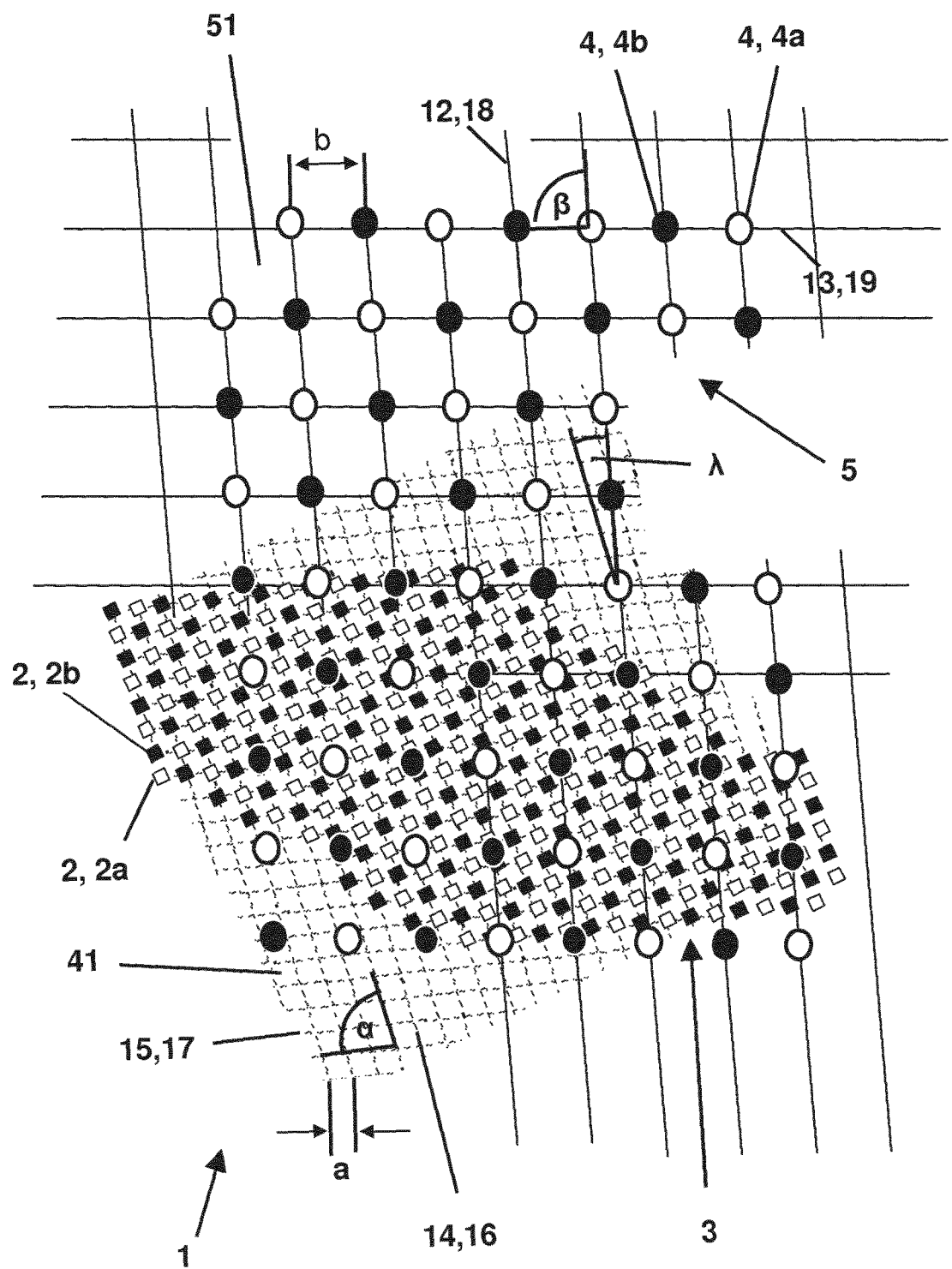

(52) U.S. Cl.
CPC ............ *B01J 2219/32213* (2013.01); *B01J 2219/32227* (2013.01); *B01J 2219/32237* (2013.01); *B01J 2219/32248* (2013.01); *B01J 2219/32251* (2013.01); *B01J 2219/32408* (2013.01); *B01J 2219/32425* (2013.01); *B01J 2219/32483* (2013.01)

(58) Field of Classification Search
USPC ........................... 261/112.1, 112.2, DIG. 72
See application file for complete search history.

(56) References Cited

U.S. PATENT DOCUMENTS

| | | | |
|---|---|---|---|
| 4,296,050 A | 10/1981 | Meier | |
| 4,344,899 A * | 8/1982 | Monjoie | B01J 19/32 261/112.2 |
| 4,604,247 A | 8/1986 | Chen et al. | |
| 4,634,534 A * | 1/1987 | Cominetta | B01J 19/32 210/150 |
| 4,668,443 A * | 5/1987 | Rye | B01D 47/00 165/166 |
| 4,670,197 A * | 6/1987 | Stackhouse | B01J 19/32 261/112.2 |
| 4,673,538 A | 6/1987 | Klauss et al. | |
| 4,676,934 A | 6/1987 | Seah | |
| 4,830,792 A | 5/1989 | Wilhelm | |
| 5,876,638 A | 3/1999 | Sunder et al. | |
| 6,357,728 B1 | 3/2002 | Sunder et al. | |
| 6,478,290 B1 | 11/2002 | Ender et al. | |
| 6,511,051 B2 * | 1/2003 | Kessler | B01J 19/32 261/112.2 |
| 6,511,053 B2 | 1/2003 | Kaibel et al. | |
| 6,598,861 B2 * | 7/2003 | Sunder | B01J 19/32 261/112.2 |
| 7,267,329 B2 | 9/2007 | Sunder | |
| 7,491,325 B2 * | 2/2009 | Kulick, III | C02F 3/101 210/150 |
| 7,931,255 B2 * | 4/2011 | Tushaus | B01J 19/32 261/103 |
| 2004/0135270 A1 | 7/2004 | Lantz et al. | |
| 2010/0237519 A1 * | 9/2010 | Ausner | B01J 19/32 261/112.2 |
| 2011/0229689 A1 * | 9/2011 | Giang | B01J 19/32 428/141 |
| 2011/0309536 A1 * | 12/2011 | Ausner | B01J 19/32 261/112.2 |
| 2013/0127075 A1 * | 5/2013 | Tsujiuchi | B01D 53/18 261/112.2 |
| 2014/0322115 A1 * | 10/2014 | Duss | B01J 19/32 423/228 |

FOREIGN PATENT DOCUMENTS

| | | | |
|---|---|---|---|
| DE | 3239510 | A1 | 4/1984 |
| EP | 0190435 | A1 | 8/1986 |
| EP | 0807462 | A1 | 11/1997 |
| EP | 1029588 | A1 | 8/2000 |
| EP | 1210977 | A1 | 6/2002 |
| EP | 1310299 | A2 * | 5/2003 |
| EP | 1145761 | B1 | 12/2003 |
| EP | 1477224 | A1 | 11/2004 |
| EP | 2311556 | A1 | 4/2011 |
| FR | 2251355 | * | 6/1975 |
| RU | 5734 | U1 | 1/1998 |
| RU | 2336943 | C1 | 10/2008 |
| WO | 86/06296 | A1 | 11/1986 |

* cited by examiner

PACKING LAYER FOR STRUCTURED PACKING

The invention relates to a packing layer for a structured packing.

A packing layer for a structured packing is a foil-like, folded material in a commercial embodiment, with a plurality of packing layers being arranged behind one another in a structured packing. A crimp pattern of the packing layer in this respect has flow passages inclined with respect to a column axis. These inclined flow passages positively influence the flows of a gas phase and of a liquid phase within the structured packing, i.e. the gas phase and the liquid phase are brought into contact in the flow passages of the structured packing and the mass transfer between the phases is thus facilitated. The inclination of adjacent layers is in opposite directions so that a cross-passage structure arises.

To increase the performance, for example the separation performance, of the packing layers or of a structured packing, the surface of the packing layers or of the structured packing is typically increased. A grooving and/or a perforation in particular produces/produce an improvement in performance in packing layers. In accordance with a textbook opinion, the grooves serve for the better distribution of the liquid over the surface and the holes or the perforation serve to allow the liquid to pass from one side of the packing layer to the other. Due to the processing of the foil-like material, the holes are typically punched out, for example; however substantial material losses arise. The better distribution of the liquid, and thus a better wetting of the packing layer, allows a better utilization of the existing geometrical surface for the mass transfer. In structured packings, an improvement is usually achieved in that the percolation density per edge length of the structured packing is optimized, that is this ratio is made as large as possible to wet an existing surface.

A packing layer which comprises a foil-like material is described in U.S. Pat. No. 4,296,050. The packing layer comprises a fluting as a first fine structure, a perforation as a second fine structure and a folded appearance, for example fins, as a crimp pattern. In addition, the packing layer is aligned such that the folded appearance is aligned at an angle toward a column axis.

EP 0 190 435 A1 describes a packing layer of a thin, foil-like material whose surface is structured by stamping. In this respect, the height of the elevated portions or recesses of the first fine structure is larger than the thickness of the foil-like material. The first fine structure is formed as throughgoing, crossing channels which are identical on the front side and on the rear side of the foil-like material. The elevated portions or recesses of the first fine structure which form the channels can have different shapes; they can, for example, be shaped as pyramids, truncated pyramids, cones, truncated cones or as part spheres.

A structured packing which has packing layers which are arranged perpendicular and have a crimp pattern and which has standing rows of holes arranged in a spaced manner transversely to the column axis is disclosed in DE 26 01 890 A1. The packing layers are in this respect arranged in the column such that the packing layers are arranged parallel to the column axis. The crimp pattern is inclined with respect to the column axis, with adjacent packing layers being arranged such that their crimp pattern crosses. With packing layers in the planar state, that is without a crimped pattern, the holes of adjacent hole rows disposed above one another are mutually offset such that the drop path disposed between two respective holes of the topmost hole row is incident on holes of hole rows disposed beneath it.

An ordered column packing is described in EP 1 145 761 B1 which comprises packing layers of a foil-like material, a first fine structuring and a second fine structuring and a crimp pattern. The packing layer is sectioned or stamped with concave and convex structural elements in an alternating arrangement and has a second fine structure which comprises apertures which are arranged in regular form and which are produced, for example, by means of a plastic shaping. In this respect, a mean spacing a is present between the centers of adjacent concave or convex structural elements and a mean spacing b is present between the centers of adjacent apertures, with the mean spacing b being smaller than the mean spacing a.

The plastic shaping for producing the apertures of the packing layer described in EP 1 145 761 B1 takes place, for example, by slitting or stamping so that the production of the apertures is very complex and/or expensive. In addition, the foil-like material used is an expanded metal whose processing is very complex and cost-intensive.

It is therefore the object of the invention to propose a packing layer whose production is inexpensive.

This object is satisfied in accordance with the invention by a packing layer for a structured packing, wherein the packing layer has a plurality of structural elements and the structural elements are designed and arranged such that they form a first fine structure, and wherein adjacent structural elements have a first spacing, wherein the packing layer has a plurality of dimples which are designed and arranged such that they form a second fine structure, and wherein adjacent dimples have a second spacing, wherein the structural elements and the dimples are designed as hole-free.

The first fine structure and the second fine structure are preferably located at the same location.

Advantageous embodiments of the packing layer and of the structured packing formed therefrom and of the column are further described herein.

The invention relates to a packing layer for a structured packing, wherein the packing layer comprises a plurality of structural elements and the structural elements are designed and arranged such that they form a first fine structure and wherein adjacent structural elements have a first spacing. The packing layer moreover comprises a plurality of dimples which are designed and arranged such that they form a second fine structure and wherein adjacent dimples have a second spacing. In accordance with the invention, the structural elements and the dimples are designed as hole-free.

It is advantageous that the packing layer in accordance with the invention having hole-free structural elements and dimples does not have any punching losses and has a transfer surface which is larger by approximately 10%. Measurements at packing layers having hole-free structural elements and dimples, that is having a hole-free first fine structure and second fine structure, produce the advantageous result that they have the same separation power (efficiency) with the same pressure loss as a packing layer having structural elements and holes. The surprising conclusion from the comparison is that the hole-free structural elements and dimples as a replacement for the perforation effect an efficiency which is at least as good as packing layers having holes, although a substantial function of the perforation is no longer present, namely neither the possibility for the liquid to pass through the foil-like material nor the improved gas exchange. The solution in accordance with the invention thus combines the advantage of hole-free structural elements and dimples with a lack of punching loss, whereby the packing layer can be manufactured less expensively.

The packing layer comprises a plurality of structural elements which are designed and arranged such that they form a first fine structure. The packing layer can be a foil-like material, for example a metal sheet or a foil, and the material can, for example, be a metal or a metal alloy, a stainless steel, a ceramic material or a plastic. The foil-like material advantageously comprises a metal alloy. The thickness of the foil-like material can lie, for example, in a range between 0.05 and 0.5 mm, in particular between 0.1 and 0.3 mm.

The first fine structure can be a fine-scaled basic texture or a fine-scaled fluting which is formed by the structural elements. A first fine structure is thus to be understood as a fine-scaled basic texture or a fine-scaled fluting which is produced by means of a roughening of the surface of the packing layer, for example by grooving or stamping structural elements.

The structural elements can be formed, for example, by stamping the foil-like material. The structural elements can in this respect have a convex or concave geometry. The structural elements can preferably be shaped as pyramids, truncated pyramids, cones, truncated cones or as part spheres, with tips or peaks of adjacent structural elements preferably forming elevated portions or recesses in the foil-like material facing in opposite directions. The structural elements can, however, also only form elevated portions or recesses in one direction of the foil-like material. The elevated portions or recesses of the structural elements can in this respect alternate in a regular or irregular manner; in particular five structural elements can be arranged in a W shape. A W shape is to be understood in this respect such that a structural element is arranged at all corners of the W.

The structural elements can be configured as channels due to the elevated portions or recesses and can, for example, have crossing channels which can be arranged symmetrically with respect to a column axis. In this respect, a height of the structural elements, that is a height of the elevated portions or a depth of the recesses, can be larger than the foil thickness, for example. The first fine structure which is formed by the structural elements can, for example, be identical on the front side and on the rear side. A structural element which is formed as a recess on one side of the foil-like material can in this respect correspond to an elevated portion on the oppositely disposed side, for example. It is furthermore advantageous to select a longitudinal dimension of the structural elements such that it lies, for example, between 0.5 and 5 mm and to select a depth or height of the structural elements respectively, that is of the elevated portions or recesses, such that it lies between 0.1 to 2 mm. The length dimension is in this respect to be understood as a parameter which characterizes the geometry of the structural elements or dimples parallel to the exchange surface of the packing layer, for example the diameter with a circular periphery, a side length with a square periphery or the wavelength or width of a groove or fin with a groove shape or fin shape.

The structural elements can, however, also be designed as grooves or fins and the first fine structure can thus be designed as a fine fluting. The fine fluting can comprise a tooth-like or wave-like section or stamping of the grooves or fins. The first fine structure having grooves or fins as structural elements can, for example, be configured with an angle of inclusion of 10-80 degrees, with a wavelength or width of 0.5 to 5 mm and with a depth or height respectively of 0.1 to 2 mm. The first fine structure can also be configured as throughgoing, crossing grooves or fins. The grooves or fins can be formed symmetrical to a column axis z and can include an angle of 0 to 90 degrees with the column axis. The first fine structure, that is the structural elements, irrespective of whether they are, for example, elevated portions, recesses or grooves, advantageously provides a fine-scaled spreading of the fluid without residue, in particular for the further spreading of an existing liquid film.

The packing layer moreover comprises a plurality of dimples which are designed and arranged such that they form a second fine structure and wherein adjacent dimples have a second spacing. The second fine structure can be a coarse-scaled superposition texture or a coarse-scaled fluting which is formed by the dimples. A second fine structure is thus to be understood as a coarse-scaled superposition texture or a coarse-scaled fluting which is produced by means of a roughening of the surface of the packing layer, for example by stamping dimples.

The dimples can be formed, for example, by stamping the foil-like material of the packing layer. The dimples can in this respect have a convex or concave geometry. The dimples can preferably be shaped as pyramids, truncated pyramids, cones, truncated cones or as part spheres, with tips or peaks of adjacent dimples preferably forming elevated portions or recesses in the foil-like material facing in opposite directions. The dimples can, however, also only form elevated portions or recesses in one direction of the foil-like material. The dimples can in particular also be stamped as annular dimples, wherein an inner ring can comprise, for example, a variant of the structural elements or no structural elements, preferably structural elements. However, a region can equally be present without a second fine structure, that is without dimples on the packing layer, in which region the first fine structure is at least partly still recognizable and functional, or vice versa.

The elevated portions or recesses of the dimples can in this respect alternate in a regular or irregular manner; in particular five dimples can be arranged in a W shape. A height of the dimples, that is a height of the elevated portions or a depth of the recesses, can be larger than the foil thickness, for example. The second fine structure which is formed by the dimples can, for example, be identical on the front side and on the rear side. A dimple which is formed as a recess on one side of the foil-like material can in this respect correspond to an elevated portion on the oppositely disposed side, for example. The dimples can, for example have a longitudinal dimension of 2-8 mm and a height/depth of 0.5-4 mm, preferably 1-3 mm.

The dimples can likewise be designed as grooves or fins and the second fine structure can thus be designed as a coarse fluting. The coarse fluting can comprise a tooth-like or wave-like section or stamping of the grooves or fins. The second fine structure having grooves or fins as dimples can, for example, be configured with an angle of inclusion of 10-80 degrees, with a wavelength or width of 2 to 8 mm and with a depth or height respectively of 0.5 to 3 mm. The second fine structure can also be formed from throughgoing, crossing dimples in the form of grooves which can be formed symmetrical to the column axis z, for example. The grooves can include an angle from 0 to 90 degrees with the column axis z. The second fine structure, that is the structural elements, advantageously provides a first and coarse-scaled spreading of the fluid.

The first fine structure, that is the structural elements, in this respect advantageously serves for the division of small rivulets and for the further spreading of liquid films, whereas the second fine structure, the dimples, serve for the division of the coarser flow structures, e.g. larger rivulets or thicker films are divided into two at the dimples, for example, so that small rivulets arise.

Directly adjacent structural elements have a first spacing, with the first spacing having to be defined in dependence on the geometry of the structural elements. The first spacing can be a mean spacing between the geometrical centers of gravity of the base surface or of the base line of directly adjacent structural elements. The structural elements can, for example, have a convex or a concave geometry, that is they can be formed as elevated portions or recesses, so that the first spacing is to be understood, for example, as a mean spacing between the geometrical centers of gravity of the base surface of directly adjacent elevated portions or recesses. If the structural elements are configured as grooves or fins, the first spacing can be understood, for example, as half a wavelength of the tooth-like or wave-like grooves or fins, that is of a tooth-like or wave-like elevated portion or recess. A wavelength can in this respect be defined as the spacing of two directly adjacent tooth-like or wave-like elevated portions or recesses. The half-wavelength as a first spacing then results from the fact that the geometrical center of gravity corresponds to the center of the base line of the tooth-like or wave-like elevated portion or recess and the first spacing thus corresponds to the mean spacing of the geometrical centers of gravity of directly adjacent tooth-like or wave-like elevated portions and recesses, which in turn corresponds to half the wavelength. The same definition applies to the calculation of the second spacing of directly adjacent dimples. The second spacing can therefore be understood as a mean spacing between the geometrical centers of gravity of the base surface or base line of directly adjacent dimples. The exemplary procedure can equally to transferred to the calculation of the second spacing with different geometries.

The first and second fine structures are applied to the foil-like material by a structuring, with a structuring preferably being understood as the stamping of the foil-like material. The structural elements or dimples arising in this process are preferably larger than a thickness of the foil-like material. In addition, the first fine structure can be configured as a part of the second fine structure, i.e. structural elements can be stamped onto a surface of the dimples, for example. A further substantial difference between the first and second fine structures is in this respect the ratio between the first spacing and the second spacing. The first spacing and the second spacing are different; the second spacing is preferably larger than the first spacing and the second spacing is particularly preferably at least twice the size of the first spacing. The advantage of this structuring of the foil-like material into a first and second fine structure comprising a plurality of structural elements or a plurality of dimples is that the spreading and distribution of a fluid over a surface of the foil-like material is promoted. A fluid is in this respect to be understood as at least two fluid phases, with one fluid phase being able to be a liquid or a gas, for example. The first and second fine structures, however, substantially affect the spreading of the liquid as a film over a surface of the packing layer.

On a stamping of the structural elements or dimples in one of the described embodiments, the material is advantageously maintained as an additional surface for a mass transfer. The recesses of the structural elements or dimples in this respect act differently than the elevated portions. While the elevated portions divide the fluid, the fluid collects in the recesses. Corresponding adaptations of the structural elements or dimples also promote the division of the fluid or a collection of the fluid here; for example, the elevated portions or recesses in one region of the foil-like material can be differently stamped, can in particular be more or less pronouncedly stamped, than in another region of the foil-like material, etc. The first fine structure can in particular be configured in a first W shape and the second fine structure can be configured in a second W shape, with the first W shape being able to have a spatially different alignment than the second W shape; for example, the first W shape can be rotated or translated relative to the second W shape. The first and second fine structures can otherwise have different size scales, directions or shapes depending on the application. It is advantageous that the second fine structure divides the fluid into large structures and predominantly transversely divides it over large areas, whereas the first fine structure spreads the fluid in a fine-scaled manner and locally wets the foil-like material ideally.

The packing layer of foil-like material which comprises the first and second fine structures can, for example, be folded to form a structured packing, in particular a cross-passage packing or a similarly structured packing. A structured packing can be provided for a column in which a mass transfer and a heat transfer takes place between two fluid phases. The fluid phases can, for example, be a liquid phase and a gas phase, but can also be two liquid phases. If, for example, one fluid phase is present as a flowing liquid and one fluid phase is present as a vapor phase or gas phase, the flowing liquid is guided over the structured packing as a trickle film and the vapor phase or gas phase flows in the counter-direction. The surface provided by the structured packing must be uniformly covered by the liquid phase at all points for a maximally configured transfer process.

The structural elements, in particular the first fine structure, and the dimples, in particular the second fine structure, are designed as hole-free. Hole-free is to be understood such that the structure of the foil-like material takes place by stamping, for example, and the structural elements or dimples are not holes, in particular circular holes, which are produced, for example, by means of drilling or punching. Designed as hole-free is also to be understood such that, for example, small cracks can nevertheless arise by means of stamping in the foil-like material which arise due to technical limitations in the manufacture and are not deliberately manufactured. The stamped structural elements and dimples preferably do not have any holes, however.

Some advantages of the packing layer in accordance with the invention are that the structural elements, in particular the first fine structure, and the dimples, in particular the second fine structure, can be manufactured as hole-free by means of a single machine and using little punching oil and simultaneously cause fewer manufacturing costs and less material loss.

In an embodiment of the invention, the first spacing is different than the second spacing, the second spacing is preferably larger than the first spacing, the second spacing is particularly preferably at least twice the size of the first spacing. It is advantageous that the different spacings provide a different distribution of the structural elements and dimples and allow a better distribution of the fluid as well as the better utilization of the existing geometrical surface for the mass transfer.

In an embodiment of the invention, the packing layer is designed as hole-free. Hole-free is also to be understood here such that the foil-like material does not comprise any holes which are manufactured, for example, by means of drilling or punching and the structuring of the foil-like material takes place by stamping, for example. Designed as hole-free is also to be understood such that, for example, small cracks can nevertheless arise by means of stamping in the foil-like material which arise due to technical limitations in the manufacture and are not deliberately manufactured. The stamped structural elements and dimples preferably do not have any holes, however. The punching loss can thus advantageously be further reduced.

In an embodiment of the invention, the structural elements of the first fine structure are arranged along a first parallel curve group and the dimples of the second fine structure are arranged along a second parallel curve group, with the first curve group and the second curve group being arranged at an angle of rotation with respect to one another. The first and second parallel curve groups can be parallel straight lines, but can also be formed by means of more complex arrangements of the structural elements or dimples, for example as curves or in the W shape. The angle of rotation, when the first and second parallel curve groups are straight lines, for example, means an angle $\lambda$ included by a first and second main axis of the straight lines. With curved curves, the first and second main axes correspond to the tangents at the point of intersection of the first and second parallel curve groups.

It is, however, also possible that the structural elements of the first fine structure are arranged along a first and a third parallel curve group and the dimples of the second fine structure are arranged along a second and fourth parallel curve group. The first curve group in this respect forms a first main axis of the first fine structure and the second curve group in this respect forms a second main axis of the second fine structure. The third curve group in this respect forms a first secondary axis of the first fine structure and the fourth curve group in this respect forms a second secondary axis of the second fine structure. If the curve groups are straight lines, for example, four angles result for two respective curve groups each, of which angles two oppositely disposed angles are each congruent. An angle $\alpha$ which corresponds to the smaller included angle is included between the first main axis and the first secondary axis. The larger angle, also called the secondary angle, then results from the difference $180°-\alpha$. An angle $\beta$ which corresponds to the smaller included angle and which is included between the second main axis and the second secondary axis results in an analog manner. The larger angle then results from the difference $180°-\beta$. The angle of intersection $\lambda$ corresponds to the angle of rotation $\lambda$, an angle included between the first and second main axes, which simultaneously corresponds to the angle of rotation $\lambda$ of the first and second fine structures. The determination of the first main axis and first secondary axis as well as of the second main axis and second secondary axis can be swapped as desired in this respect. The described procedure can also be transferred to a first and second fine structure having more than two respective curve groups. The angle of rotation $\lambda$ lies in a range from 0 to 90 degrees, preferably in a range from 20 to 70 degrees. The angles $\alpha$ and $\beta$ can lie in a range from 10 to 90 degrees, preferably in a range from 30 to 90 degrees.

In a particularly preferred embodiment, the first and second curve groups can also be considered in the figurative sense as a first and second periodic point grid, wherein a point of the first periodic point grid is defined by a first point of intersection between the first main axis and the first secondary axis and a point of the second periodic point grid is defined by a second point of intersection between the second main axis and the second secondary axis. In this respect, a first point of intersection, that is a point of the first periodic point grid, corresponds to a structural element and a second point of intersection, that is a point of the second periodic point grid, corresponds to a dimple. In this respect, the W shape for the structural elements and dimples, for example, can be formed. A first elementary cell and a second elementary cell which can be formed from a respective four directly adjacent points of the first or second periodic point grids can be configured as a polygon, for example as a square, a rectangle, a parallelogram or a trapezoid. The angle $\varphi$ of a rotation between the first and second fine structures thus results from the rotation of the first and second elementary cells relative to one another. In this embodiment the angle $\varphi$ corresponds to the angle of rotation $\lambda$. A translation results from a shift of two directly adjacent points of the first and second elementary cells relative to one another. There is therefore, for example, no translation of the first and second fine structures when there is no rotation and all the sides of the first and second elementary cells coincide or the sides of the first and second elementary cells are a multiple of one another and coincide. The first or second period point grids can, however, also only be locally periodic; for example, a part region of the packing layer can also have at least one further point grid which admittedly uses the same structural elements or dimples, but has different spacings or a different shape of the elementary cell.

One advantage of the described aspects and embodiments of the arrangement of the first and second fine structures is a high separation efficiency. The angle $\varphi$ which corresponds to the angle of rotation $\lambda$ lies in a range from 0 to 180 degrees, preferably in a range from 0 to 90 degrees, particularly preferably in a range from 20 to 70 degrees.

In an embodiment of the invention, the second spacing is at least twice the size of a longitudinal dimension of one of the dimples. A longitudinal dimension is in this respect to be understood in dependence on the geometry of the dimples as a characteristic measure for the geometry, for example, for spherical dimples, the diameter or a full width at half maximum of the dimples, that is a width at half the level between the highest and lowest points of a dimple or, for pyramidal dimples, a maximum width of the base surface of the dimple. The longitudinal dimension of a dimple can extend over two adjacent structural elements so that, for example, structural elements can be formed on a surface of the dimples. A height of the dimple is in particular larger than a height of the structural elements. The dimples advantageously have the dimension of the coarser structures, e.g. the height of the rivulets, and thus distribute coarser flow structures better.

In an embodiment of the invention, a structural element is configured as a concave structural element or as a convex structural element or a dimple is configured as a concave dimple or as a convex dimple. In addition, the first fine structure is designed such that concave structural elements and convex structural elements are arranged alternately or the second fine structure is designed such that concave dimples and convex dimples are arranged alternately.

Due to the convex or concave geometry of the structural elements or dimples, they form an elevated portion or a recess. An elevated portion on the one side of the foil-like material in this respect corresponds to a recess on the other side of the foil-like material and vice versa. An alternating arrangement can thus be understood such that, when two adjacent elevated portions on the one side of the foil-like material bound a recess, two valleys on the other side bound an elevated portion. In addition, an alternating arrangement is to be understood such that a concave structural element is always followed by a convex structural element as a direct neighbor and vice versa. A concave dimple is always followed by a convex dimple as a direct neighbor and vice versa.

The structural elements can form channels by means of the elevated portions or recesses and can, for example, have crossing channels which are arranged symmetrical with respect to a column axis. In this respect, a height of the structural elements, that is a height of the elevated portions or a depth of the recesses, can be larger than the foil thickness, for example. The first fine structure which is formed by the structural elements can, for example, be identical on the front side and on the rear side. A structural element which is formed as a recess on one side of the foil-like material can in this respect correspond to an elevated portion on the oppositely disposed side, for example.

Due to the first and second fine structures, channels can form between the convex and concave structural elements or dimples and the fluid can, for example, be distributed evenly over the packing layer along the channels under the effect of capillary forces and the forces of gravity. The fluid can overflow at an intersection point of the channels from the one channel into the other channel so that a good cross-mixing is achieved. As a result of a symmetrical flow-off of the fluid over the packing layer in accordance with the invention, no unwanted marginal effects moreover occur which would degrade the mass transfer or the heat transfer between the liquid and the gas phases.

As has surprisingly been found in practice, the packing layer formed in accordance with the invention which comprises a first and a second fine structure also has an ideal mass transfer or heat transfer for the fluid for a poorly wetting fluid, for example water, and for poorly wettable materials such as stainless steel. The concave structural elements or concave dimples are filled with the fluid, with the tendency to a collection in the central region arising due to the surface tension. The fluid has the tendency to move back on a convex rear side and to leave the surface dry. The first and second fine structures thus promote the propagation of the fluid on the surface of the foil-like material and thus noticeably contribute to the transfer process.

In an embodiment of the invention, at least one dimple has a peripheral edge and/or the peripheral edge has at least one perforation. The peripheral edge of the dimple can, for example, be configured as a closed annular stamping, that is as an elevated portion having a recess within the closed annular stamping. The peripheral edge can, however, also comprise a perforation, whereby the fluid can advantageously be split into two part flows at an elevated portion, which promotes the wetting of the surface, with the material simultaneously being maintained as a surface. A perforation is to be understood as an interruption of the peripheral edge so that the peripheral edge is, for example, not a closed peripheral edge. The rear side of the annular stamping acts slightly differently. The liquid here collects in one recess of the closed annular stamping and leaves it on the other recess. The perforation in this respect advantageously promotes the passage of the liquid through the peripheral edge into the interior of the dimples.

In an embodiment of the invention, a crimp pattern is superposed on the first and second fine structures and the crimp pattern forms adjacent flow passages. The crimp pattern can be understood as a fold, for example a zigzag-folded appearance, in particular fins. The crimp pattern can comprise regularly and/or irregularly alternating folds. The folds can have a uniform amplitude, that is height or depth, and can have the same wavelength in a figurative sense, that is can have the same spacing. The crimp pattern can have an amplitude, for example, of 4-46 mm, in particular of 6.5-15 mm and can have a wavelength of 7-90 mm, in particular of 10-37 mm. The fold angle, that is the angle between the column axis and a fin direction, can amount, for example, to 0-60 degrees, preferably 20-50 degrees and particularly preferably 30-45 degrees. The crimp pattern thus forms peaks and valleys, with the valleys being configured as flow passages on the respective side of the foil-like material. The fins of the crimp pattern can also have an S-shaped course along a surface of the packing layer. An S-shaped course can be understood, for example, as a course of the fin whose one fin end extends parallel to the column axis whose middle fin part is inclined by an angle of 30 to 60 degrees toward the column axis and whose other fin end again extends parallel to the column axis. The pressure loss in the structured packing can advantageously thereby be minimized. A further advantage is that a further structure of the packing layer is thus present which allows an ideal flow of the fluid phase as well as an ideal mass transfer. The crimp pattern substantially has effects on the spread of a gas phase, in particular of a gas or of a vapor.

This crimp pattern forms the already-named cross-passage structure. In this respect, a passage corresponds to a valley of the crimp pattern. In addition, the crimp pattern can be inclined with respect to the vertical, which preferably corresponds to the column axis. The column axis is in the operating state, that is when the packing layer is installed in a structured packing and the structured packing is installed in a mass transfer apparatus, for example a column, the vertical of the mass transfer apparatus. Crimp patterns of directly adjacent packing layers, in particular in structured packings, can be inclined in the opposite direction, for example with respect to the column axis. Furthermore, the crimp pattern can hold the packing layers, for example in a structured packing, at a spacing from one another or can form open flow passages for the gas.

In an embodiment of the invention, the packing layer comprises a plurality of cut-outs. The cut-outs are designed and arranged such that they form a third fine structure, with adjacent cut-outs having a third spacing. The third spacing is different than the first spacing and than the second spacing; the third spacing is preferably larger than the first and second spacings. In addition, the cut-outs, in particular the third fine structure, are configured as holes.

The combination of the packing layer in accordance with the invention with cut-outs, for example holes or slits, so that a pressure compensation can take place and an equilibrium can be adopted between the packing layers, is of advantage. The cut-outs can be very small, preferably so small that they can be manufactured using a stamping machine in the same processing step as the first and second fine structures. The cut-outs can also only be realized on a part of the packing layer, for example only in an upper and/or middle region of the packing layer. The cut-outs can also be aligned at the crimp pattern; for example, holes or slits can be aligned transversely to the crimp pattern.

The packing layer in accordance with the invention can also be part of a structured packing which comprises a plurality of packing layers, in particular parallel packing layers, with adjacent packing layers contacting one another and the flow passages of adjacent packing layers crossing in an open manner. Unfolded metal sheets which separate crossing passages from one another can also be introduced between adjacent packing layers. A medium for mass transfer between the fluid, which comprises two fluid phases, for example, is understood as a structured packing. The structured packing is used in a mass transfer apparatus. The mass transfer apparatus can in particular be designed as a column which can be used, for example, for an absorption or desorption, preferably for a rectification or for an extraction.

In these processes, a less dense fluid phase, for example vapor or a gas, flows upwardly along the column axis. A denser fluid phase, for example a liquid, flows downwardly in counterflow as a trickle film over the surfaces of the packing layers and, under certain circumstances, also downwardly and/or upwardly as droplets. A transfer of certain components, for example high-volatiles and low-volatiles, takes place between the upwardly and downwardly flowing fluid phase in the mixture and a heat exchange takes place. In the distillation, for example, the denser fluid phase is collected in a sump of the column and evaporates at least partly there so that it rises again through the column as a less dense fluid phase. This less dense fluid phase is condensed at a head of the column by means of a chiller and can flow downwardly again as a denser fluid phase. In the sump and at the head of the column, product flows can be led off which contain a higher portion of high-volatiles in the sump and a higher portion of low-volatiles at the head. A flow to be processed having low-volatiles and high-volatiles is introduced into the column anywhere along the column. Further product flows can be led off at other points between the sump and the base.

The mass transfer apparatus can contain a plurality of structured packings which can be arranged above one another and can thus form a packing bed, for example. A structured packing can also be composed of modules or of individual packing layers. The modules or individual packing layers can in this respect be spaced apart from one another by means of a spacer. The structured packing can be arranged in a column such that the mass transfer part of the column is filled with at least two structured packings arranged above one another, with the crimp pattern of upright packing layers of structured packings arranged above one another being able to be rotated by an angle with respect to one another about the column axis. Equally, the upright packing layers of structured packings standing above one another can be rotated by an angle with respect to one another about the column axis.

A surface of the structured packing or of the packing layer can, for example, be coated with substances; for example for corrosion protection, for a further improvement of the wettability or as a catalyst layer for a chemical reaction.

The invention furthermore relates to a column having a plurality of structured packings arranged above one another and having one or more packing beds arranged above one another. In addition, the structural elements and the dimples can be manufactured in a single production run for manufacturing a packing layer in accordance with the invention.

The invention further relates to a use of a packing layer for carrying out a mass transfer and/or a heat transfer between a less dense fluid phase and a denser fluid phase in a mass transfer apparatus, in particular in a column, with the less dense fluid phase flowing upwardly and the denser fluid phase flowing downwardly. The mass transfer apparatus contains a structured packing and this structured packing comprises the packing layer. The denser phase flows at least partly as a film over the packing layer.

Further advantages, features and details of the invention result with reference to the description of the embodiments and of the drawings.

Figure 2A:
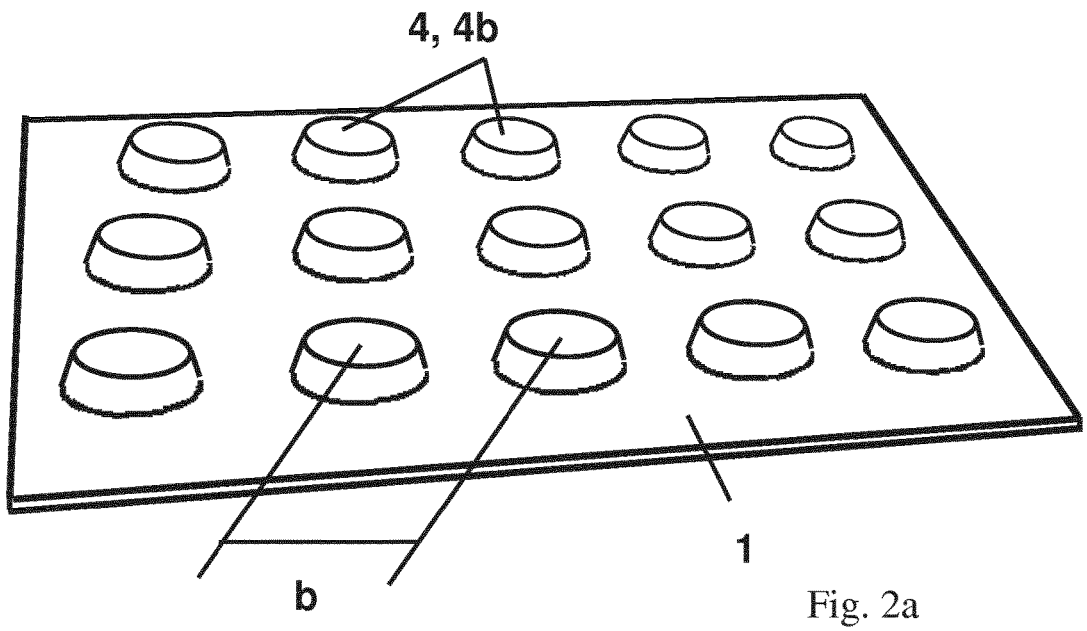
Figure 2B:
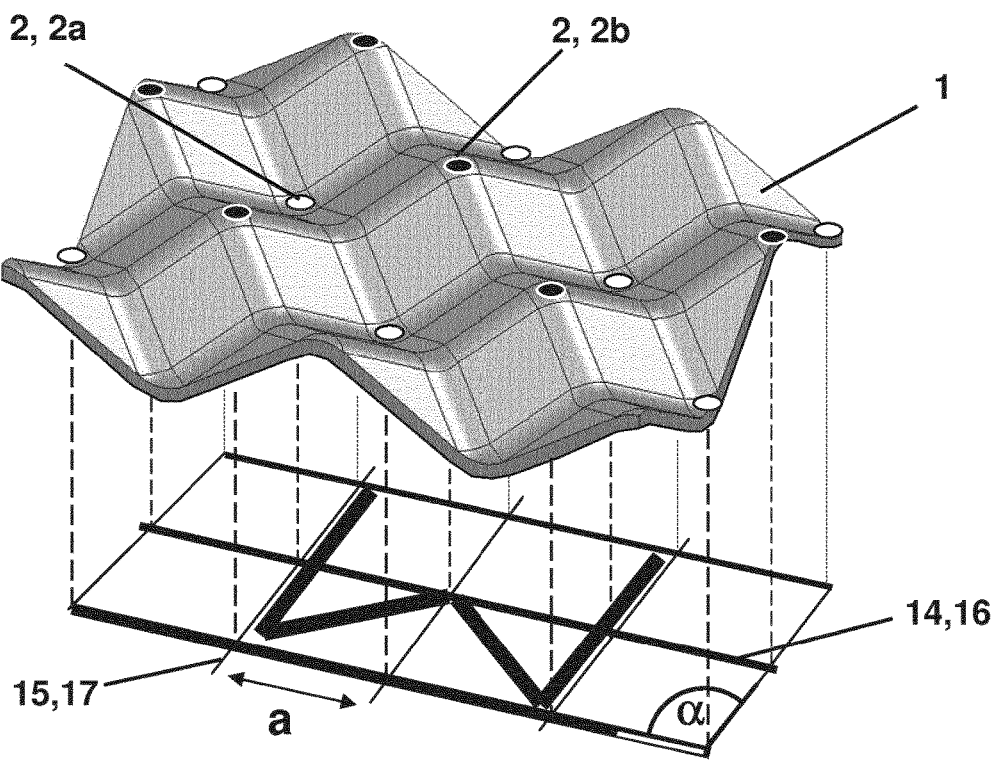
Figure 2C:
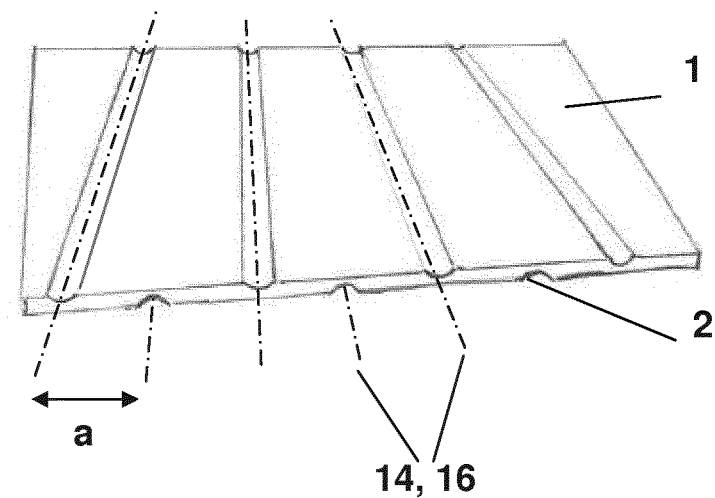
Figure 3A:
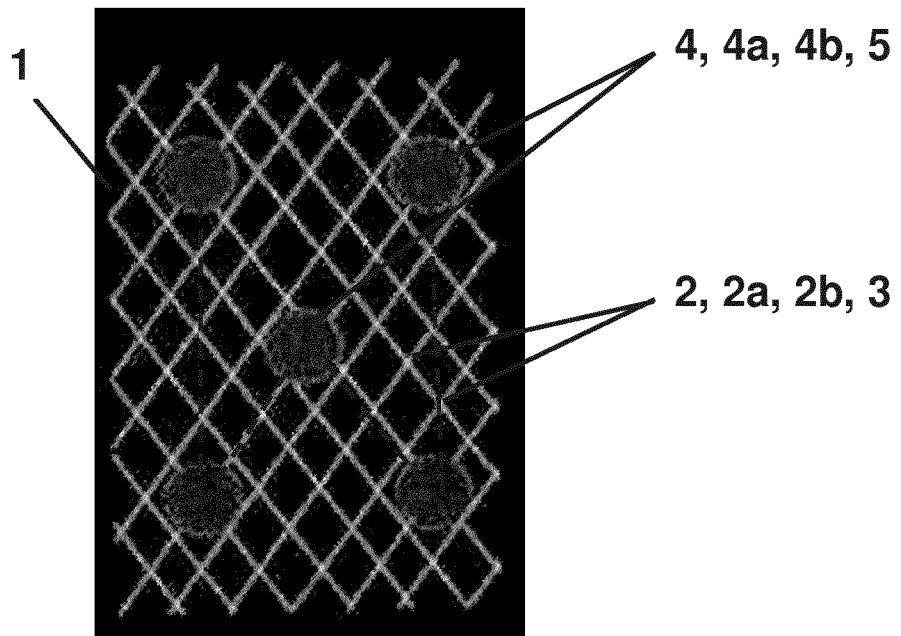
Figure 3B:
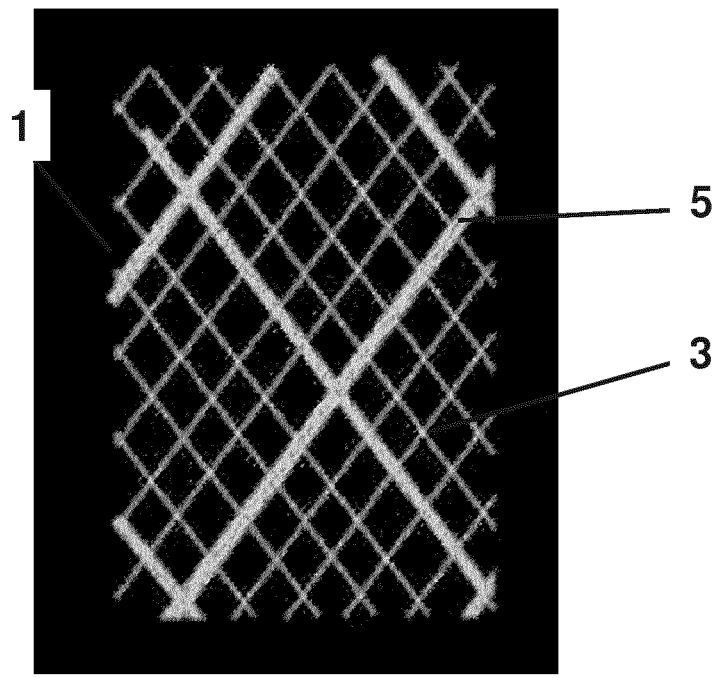
Figure 4A:
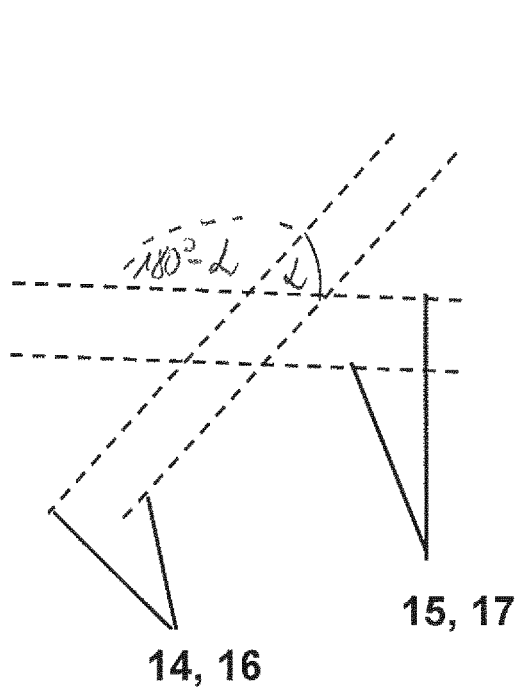
Figure 4B:
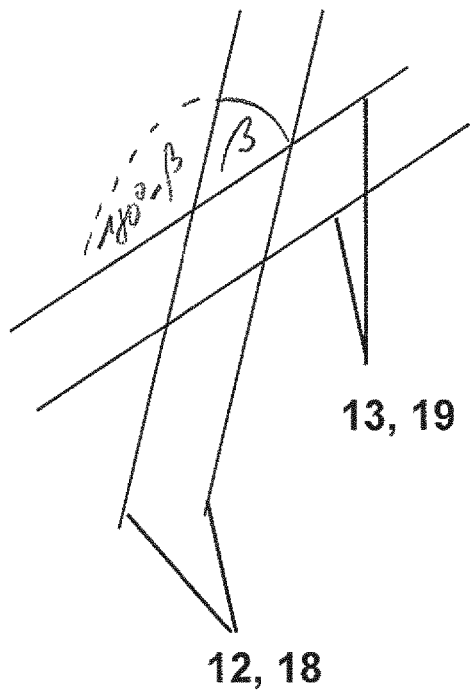
Figure 4C:
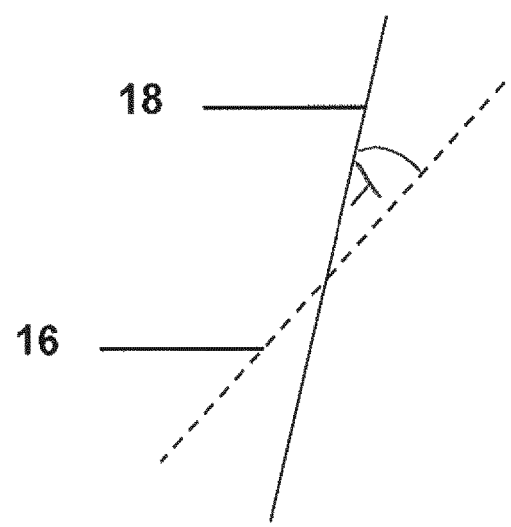
Figure 5:
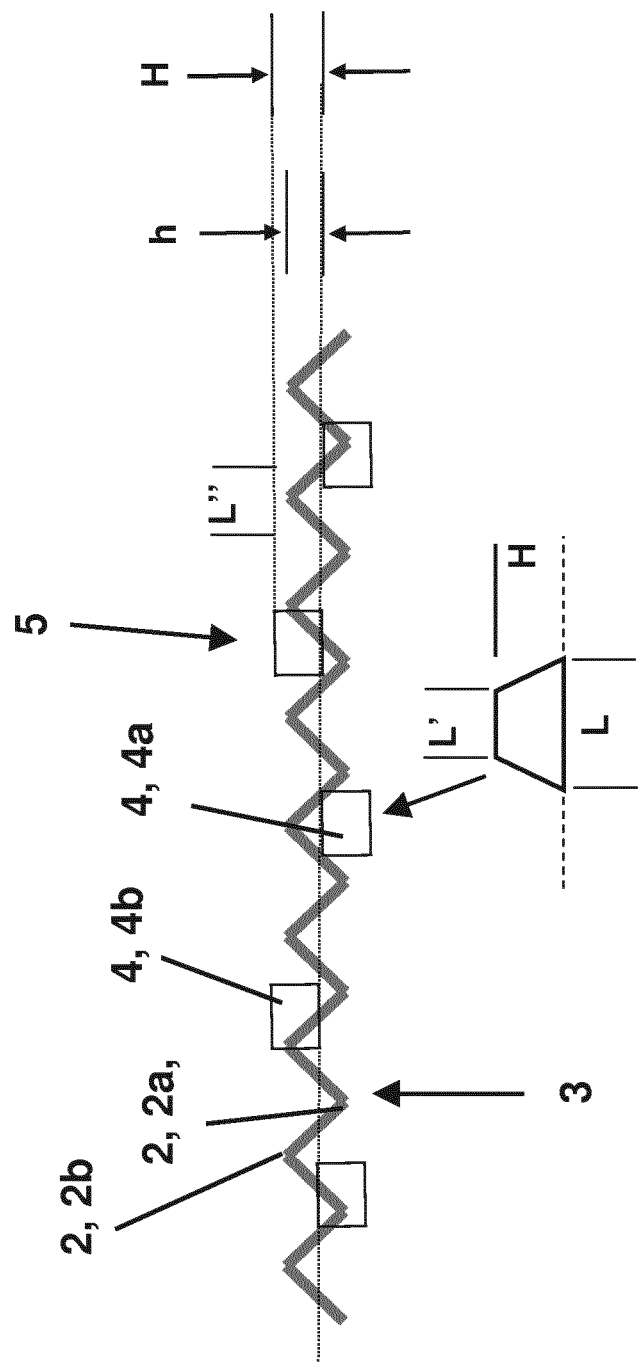
Figure 6A:
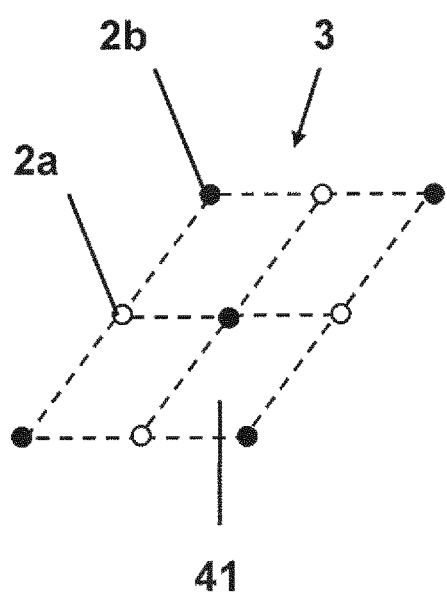
Figure 6B:
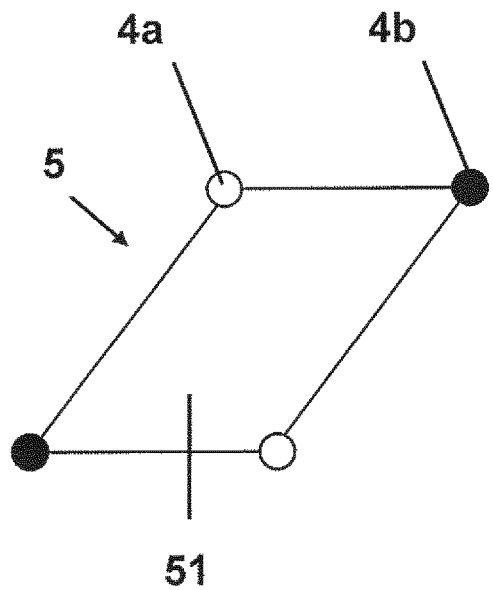
Figure 6C:
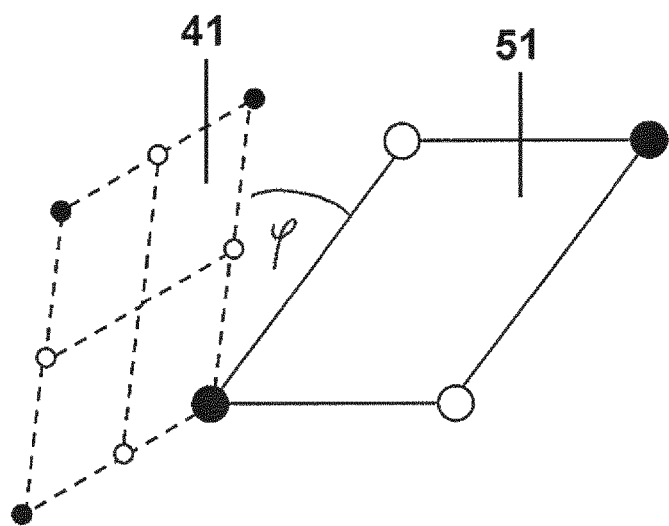
Figure 8:
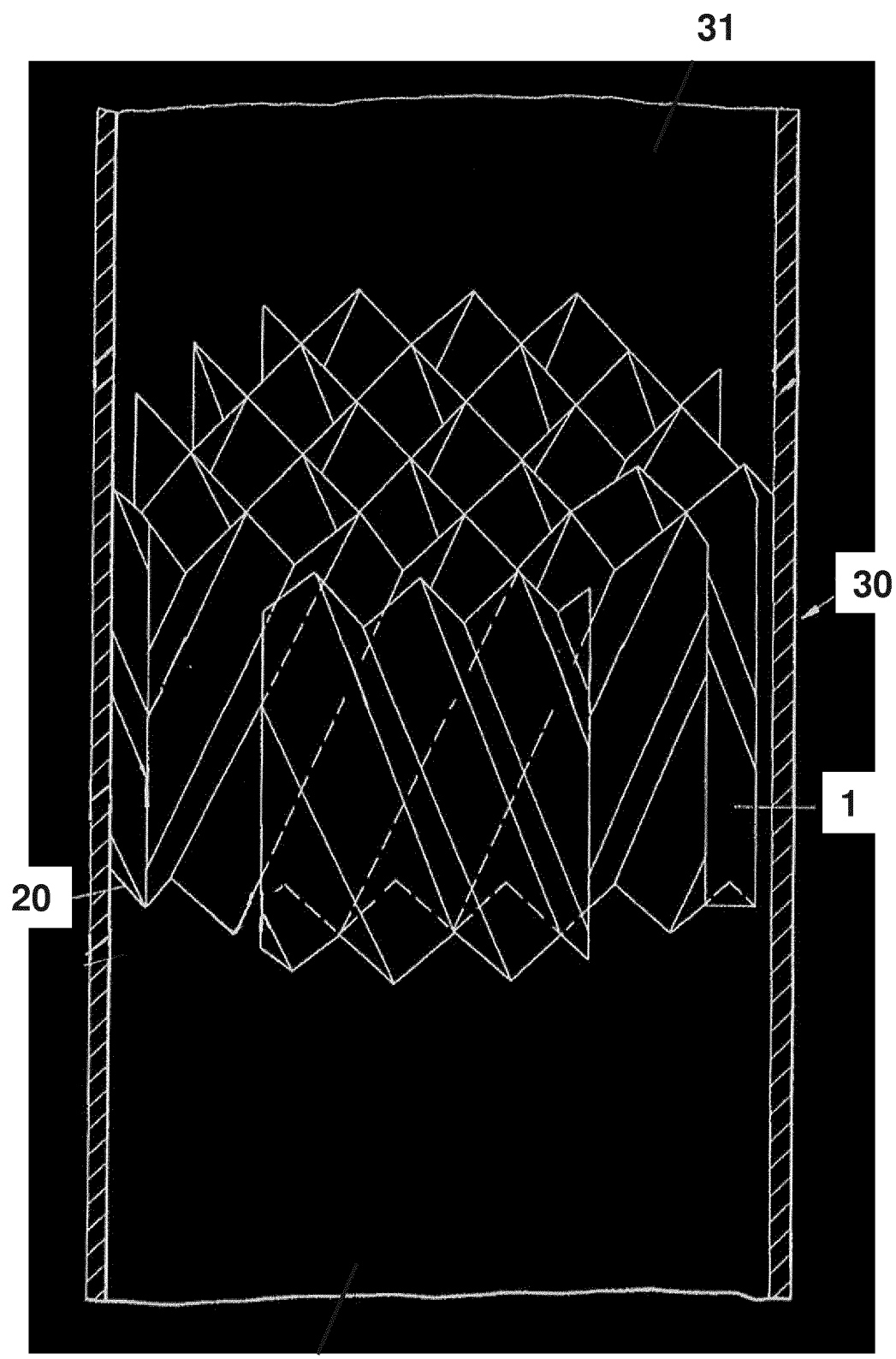
Figure 9:
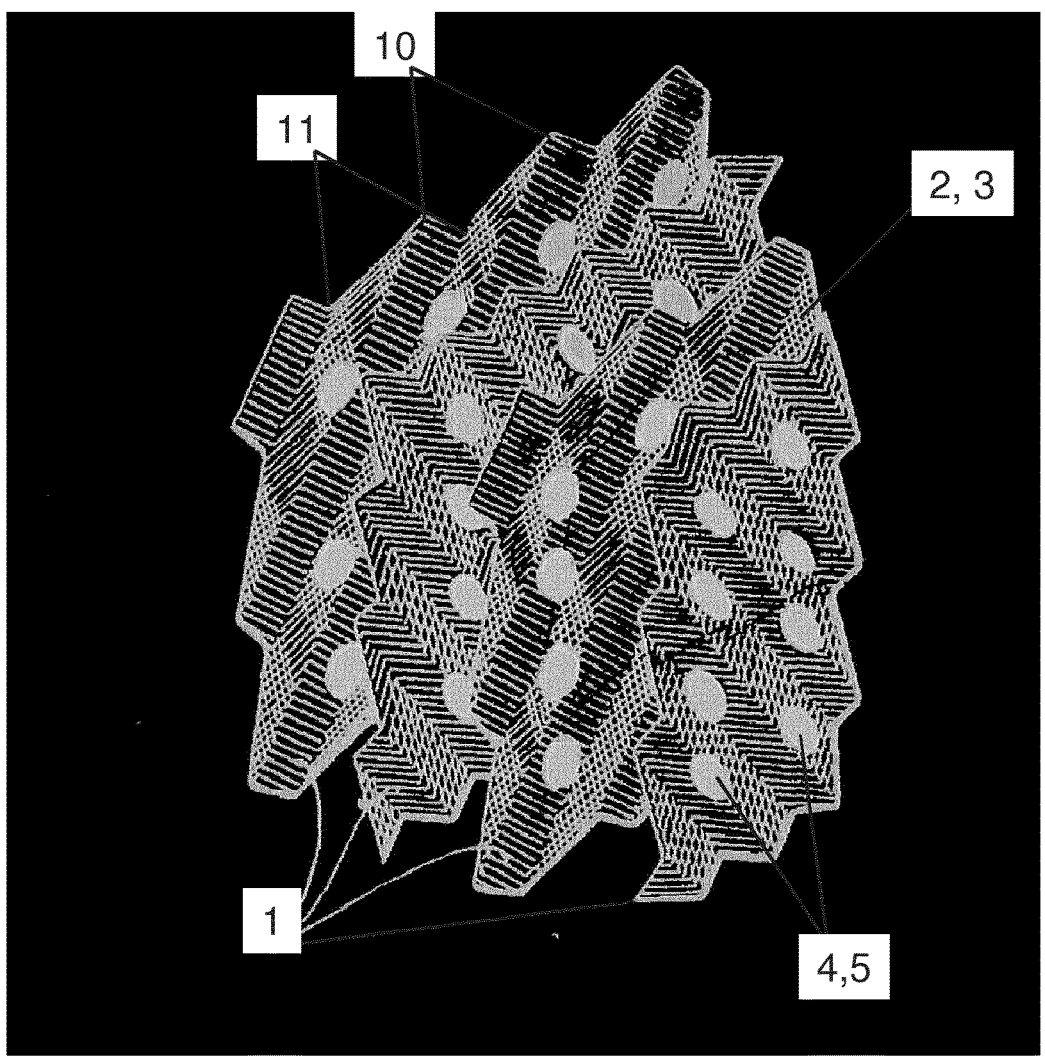

The invention will be explained in more detail in the following both in an apparatus respect and in a process engineering aspect with reference to embodiments and to the drawings. There are shown in the schematic drawing:

FIG. 1 a packing layer in accordance with the invention with a first and a second fine structure in accordance with a first embodiment;

FIG. 2a a packing layer in accordance with the invention with a second fine structure with dimples;

FIG. 2b a packing layer in accordance with the invention with a first fine structure with structural elements;

FIG. 2c a packing layer in accordance with the invention with the first fine structure with grooves as structural elements;

FIG. 3a a packing layer in accordance with the invention with a schematic representation of the first and second fine structures in accordance with a second embodiment;

FIG. 3b a packing layer in accordance with the invention with a schematic representation of the first and second fine structures as parallel curve groups;

FIG. 4a a schematic representation of the first and third curve groups of the first fine structure and their angle of intersection α;

FIG. 4b a schematic representation of the second and fourth curve groups of the second fine structure and their angle of intersection β;

FIG. 4c a schematic representation of the first main axis of the first fine structure and of the second main axis of the second fine structuring and of the angle of rotation λ;

FIG. 5 a section through a packing layer in accordance with the invention with schematic representations of the first and second fine structures in accordance with a third embodiment of the invention;

FIG. 6a a schematic representation of a first elementary cell of the first fine structure in a first point grid;

FIG. 6b a schematic representation of a second elementary cell of the second fine structure in a second point grid;

FIG. 6c a schematic representation of the first elementary cell and of the second elementary cell and the included angle φ;

FIGS. 7A-7F embodiment variants of the dimples of the second fine structure;

FIG. 8 a schematic representation of a column with a structured packing and a packing layer in accordance with the invention; and FIG. 9 a plurality of packing layers in accordance with the invention in accordance with a fourth embodiment.

FIG. 1 shows a packing layer 1 in accordance with the invention having a first fine structure 3 and a second fine structure 5 in accordance with a first embodiment. The first fine structure and the second fine structure are in this respect located at the same location. The first fine structure 3 is formed from a plurality of structural elements 2, wherein the convex structural elements 2b and the concave structural elements 2a have a pyramid-shaped geometry. Adjacent structural elements have a first spacing a, wherein the first spacing a corresponds to the spacing of the geometrical centers of gravity of two directly adjacent structural elements 2. FIG. 1 furthermore shows the second fine structure 5 which is formed from a plurality of dimples 4 and which likewise has convex dimples 4b and concave dimples 4a as well as an approximately cylindrical geometry. Adjacent dimples have a second spacing b, wherein the second spacing b corresponds to the spacing of the geometrical centers of gravity of two directly adjacent dimples 4.

In addition, the first and second fine structures 3, 5 form a first and a second point grid. A point of the first point grid corresponds to a structural element 2, wherein four directly adjacent structural elements 2 form a first elementary cell 41. A point of the second point grid equally corresponds to a dimple 4, with four directly adjacent dimples 4 forming a second elementary cell 51. In this schematic representation, the first elementary cell 41 and the second elementary cell 51 have a rectangular or parallelogram-shaped base surface and the first and second elementary cells 41, 51 are rotated by an angle of rotation λ relative to one another, whereby a rotation of the first and second fine structures 3, 5 results.

In the schematic representation of FIG. 1, a first parallel curve group 14, a third parallel curve group 15 and also a second parallel curve group 12 and a fourth parallel curve group 13 are shown. The first curve group 14 in this respect forms a first main axis 16 and the third curve group 15 forms a first secondary axis 17 of the first fine structure 3. The second curve group 12 equally forms a second main axis 18 of the second fine structure 5 and the fourth curve group 13 forms a second secondary axis 19 of the second fine structure 5. The structural elements 2 are each arranged along a straight line of the first and third parallel curve groups 14, 15. An angle α is included between the first main axis 16 and the first secondary axis 17 and corresponds to the smaller included angle at a point of intersection of the first and third parallel curve groups. The dimples 4 are also each arranged along a straight line of the second and fourth parallel curve groups 12, 13. The angle β which corresponds to a smaller included angle is included between the first main axis 18 and the first secondary axis 19. The smaller angle of intersection λ included between the first and second main axes corresponds to the angle of rotation λ of the first and second fine structures 3, 5.

FIG. 2a shows a packing layer 1 in accordance with the invention having a second fine structure 5 and dimples 4 in accordance with FIG. 1. The dimples 4 are convex dimples 4b, but can also have a concave geometry, that is can be concave dimples (not shown). The dimples 4 are therefore only formed as elevated portions in one direction of the foil-like material in FIG. 2a. Adjacent dimples 4 have a second spacing b.

FIG. 2b shows a packing layer 1 in accordance with the invention having a first fine structure 3 and structural elements 2 in accordance with FIG. 1. The structural elements 2 having concave structural elements 2a and convex structural elements 2b are designed and arranged such that they form the first fine structure 3. Adjacent structural elements 2 have a first spacing a as shown in the projection. The first parallel curve group 14 and the third parallel curve group 15 which form the first main axis 16 and the first secondary axis 17 of the first fine structure 3 include the angle α. In addition, the W shape of the structural elements is shown schematically in the projection.

FIG. 2c shows a packing layer 1 in accordance with the invention having the first fine structure 3 with structural elements 2, with the structural elements 2 being grooves. The spacing between the structural elements 2 corresponds to the first spacing a. The structural elements 2 are aligned along the first parallel curve group 14 which also simultaneously forms the first main axis 16.

FIG. 3a shows a packing layer 1 in accordance with the invention having a first and second fine structure 3, 5 in accordance with a second embodiment. The first fine structure and the second fine structure are in this respect located at the same location. In this respect, five dimples 4 are arranged in a W shape (schematically indicated in a dashed line) which forms a basic structure of the second fine structure. The dimples 4 are concave and convex dimples 4a, 4b which are arranged alternately. The dimples 4 can, however, also only be concave dimples 4a or only convex dimples 4b or irregularly alternating concave and convex dimples 4a, 4b, that is elevated portions or recesses. In addition, a first fine structure 3 can be seen which is likewise formed by five structural elements 3 which are arranged in a W shape (not shown). In this preferred second embodiment, the structural elements 2 of the first fine structure 3 and the dimples 4 of the second fine structure 5 in a figurative sense form a first and a second period point grid. In this respect, a point of the first periodic point grid corresponds to a structural element 2 and a point of the second periodic point grid corresponds to a dimple 4.

FIG. 3b shows a packing layer 1 in accordance with the invention with a schematic representation of the first and second fine structures 3, 5 as a point grid in accordance with FIG. 3a. In this respect, a first elementary cell 41 is shown, which is formed from a respective four directly adjacent points of the first fine structure 3, and a second elementary cell 51 is shown, which is formed form a respective four directly adjacent points of the second fine structure 5. The first and second elementary cells 41, 51 have a parallelogram-shaped base surface.

FIG. 4a shows a schematic representation of a first parallel curve group 14 and of a third parallel curve group 15 of the first fine structure 3 as well as their angle of intersection α. The first curve group 14 in this respect forms a first main axis 16 of the first fine structure and the third curve group 15 forms a first secondary axis 17 of the first fine structure 3. The structural elements (not shown) are each arranged along a straight line of the first and third parallel curve groups 14, 15. Four angles result for two respective curve groups each, of which angles two oppositely disposed angles are each congruent. An angle α which corresponds to a smaller included angle is included between the first main axis 16 and the first secondary axis 17. A larger angle, also called the secondary angle, then results from the difference 180°−α.

FIG. 4b shows a schematic representation of a second parallel curve group 12 and of a fourth parallel curve group 13 of the second fine structure 5 and also an angle β. The second curve group 12 in this respect forms a second main axis 18 of the second fine structure 5 and the fourth curve group 13 forms a second secondary axis 19 of the second fine structure 5.

The dimples (not shown) are each arranged along a straight line of the second and fourth parallel curve groups 12, 13. Four angles result for two respective curve groups each, of which angles two oppositely disposed angles are each congruent. The angle β which corresponds to a smaller included angle is included between the first main axis 18 and the first secondary axis 19. A larger angle, also called the secondary angle, then results from the difference 180°−β.

FIG. 4c shows a schematic representation of the first main axis 16 of the first fine structure 3 and of the second main axis 18 of the second fine structure 5 and of the angle of rotation λ. The smaller angle of intersection λ included between the first and second main axes 16, 18 corresponds to the angle of rotation λ of the first and second fine structures 3, 5.

FIG. 5 shows a section through a packing layer 1 in accordance with the invention with schematic representations of the first and second fine structures 3, 5 in accordance with a third embodiment of the invention. The first fine structure and the second fine structure are in this respect located at the same location. The first and second fine structures 3, 5 are shown with the respective structural elements 2, 2a, 2b and the dimples 4, 4a, 4b. Both concave structural elements 2a and dimples 4a as well as convex structural elements 2b and dimples 4b are shown. The structural elements 2 and the dimples 4 are designed as hole-free. The dimples 4 are configured as substantially annular and mainly as a closed full cylinder in FIG. 5. The dimples 4 can, however, also be configured as annular and form an open cylinder or can also be configured as annular as a closed full cylinder (not shown). Furthermore, the longitudinal dimensions L, L' of the dimples 4 as well as the longitudinal dimension L" of the structural elements 2 and also the height H of the dimples and the height h of the structural elements are shown.

In FIG. 6a, a first elementary cell 41 of the first fine structure 3 is shown schematically in a first point grid. Both concave structural elements 2a and convex structural elements 2b are shown. FIG. 6b shows the analog schematic representation of a second elementary cell 51 in a second point grid of the second fine structure 5. Both concave dimples 4a and convex dimples 4b are also shown here. In FIG. 6c, the angle φ included by the first elementary cell 41 and the second elementary cell 51 is shown schematically. In this schematic representation, the first elementary cell and the second elementary cell 51 have a parallelogram-shaped base surface and the first and second elementary cells 41, 51 are rotated by the angle of rotation φ relative to one another, whereby a rotation of the first and second fine structures 3, 5 results.

Figures 7A, 7B, 7C, 7D, 7E, 7F:
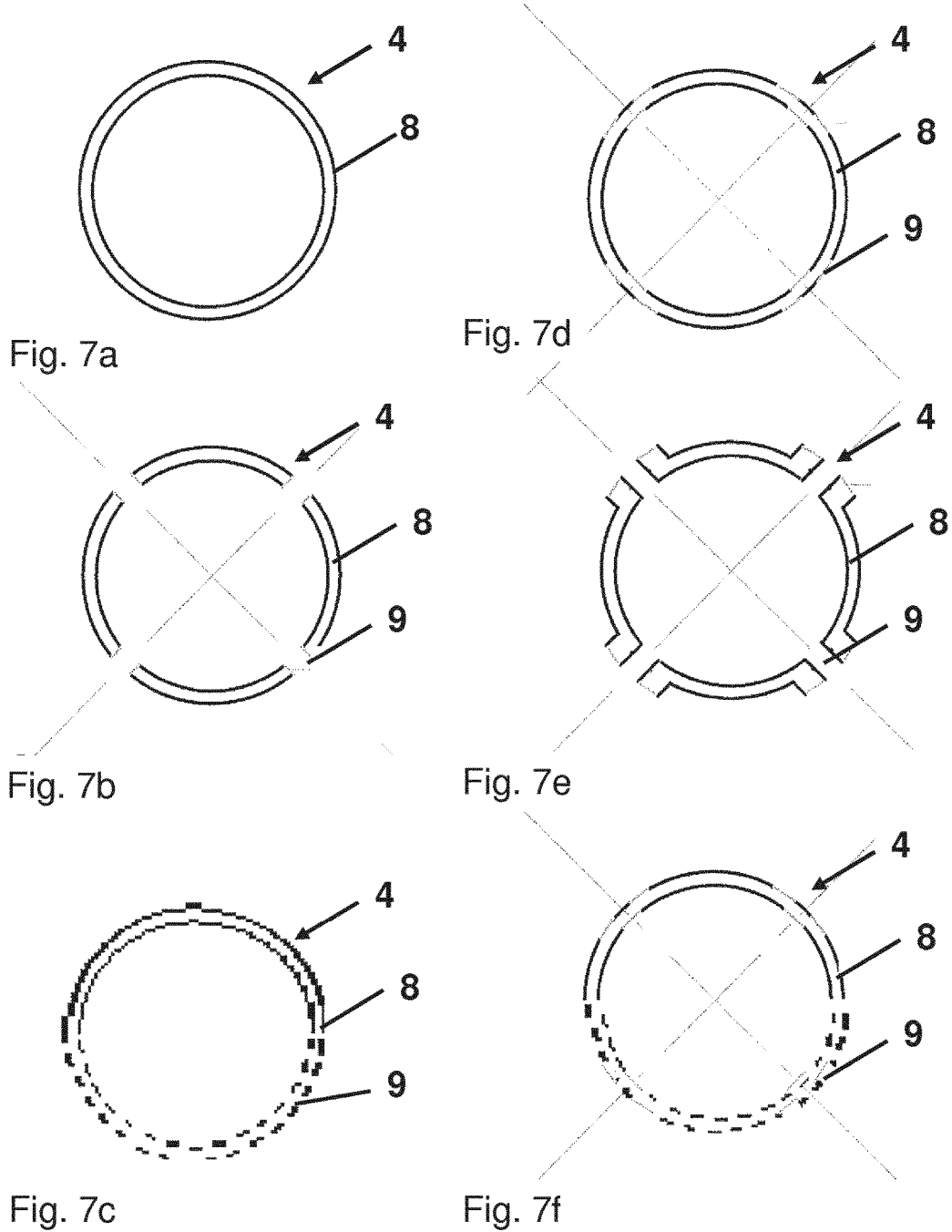

FIG. 7a can be configured in accordance with one of the embodiments in accordance with FIG. 5. FIG. 7b shows a dimple 4 which has a peripheral edge 8, with the peripheral edge 8 having a plurality of perforations 9. FIG. 7c shows a dimple 4 which is partly located on the front side and partly on the rear side of the packing layer 1. FIG. 7d shows a dimple 4 having slit-shaped perforations. FIG. 7e shows a dimple 4 with perforations and projections adjacent to the perforations. FIG. 7f shows a dimple 4 which has slit-shaped perforations and is partly located on the front side and partly on the rear side of the packing layer 1.

FIG. 8 shows a column 30 comprising some layers of a structured packing 20 which form a structured packing and which in turn comprise a plurality of packing layers 1. The structured packing 20 comprises a plurality of packing layers 1 which are in a regularly repeating geometrical relationship to one another. The spacing of adjacent packing layers 1 can be selected as an example for this geometrical relationship. In accordance with the geometrical relationship, the spacings of adjacent packing layers 1 from one another can periodically adopt the same value so that a structure arises from the sum of the packing layers 1 which is characterized by the same or at least periodically the same spacings. The periodicity is found in the total structured packing 20, whereby the structured packing 20 is given a regular structure. The structure can in particular be configured as a corrugated section.

In contrast thereto, bulk-fill body packings comprise bulk-fill bodies, that is elements of the same geometrical structure, with, however, each bulk-fill body being able to have any desired spacings and orientations with respect to adjacent bulk-fill bodies so that a periodicity of these spacings is not recognizable. The bulk-fill bodies are introduced into the column as fill. They form a heap on a column base. The heap is characterized by the random arrangement of the individual bulk-fill bodies.

The packing layers 1 comprise thin-walled elements which have a corrugated section. The corrugated section is characterized by a periodically repeating sequence of elevated portions, that is of wave peaks and valley-like depressions, that is wave valleys. This corrugated section can in particular be made as a fold with a zigzag section with acutely converging edges. The packing layers are arranged with respect to one another so that the corrugated sections of two adjacent packing layers are inclined at an angle with respect to the main direction of flow. The corrugated sections of adjacent packing layers 1 are arranged cross-wise with respect to one another.

The following applies to two adjacent packing layers 1 of the structured packing 20 in accordance with FIG. 8: A first packing layer is arranged adjacent to a second packing layer. The first packing layer and the second packing layer comprise a foil-like material of sheet metal or metal fabric, but alternatively thereto also foil-like material of plastic or ceramic material. The foil-like material can in this respect comprise the total packing layer, but can also only form a part thereof. The foil-like material can have the form of a plate which comprises a corrugated section, in particular a zigzag section or a corrugated section with rounded peaks and valley bottoms. The foil-like material can have coatings of plastics or ceramic material to make the resistance of the packing layer toward chemical influences such as corrosion or thermal influences such as temperature or mechanical influences such as pressure more enduring or to improve the wettability.

The packing layers 1 in FIG. 8 are shown in a view which shows a detail of a first surface of the structured packing 20. The first surface of the structured packing 20 is arranged substantially normal to the main direction of flow. The flow direction is called the main flow direction in which a more easily volatile fluid, in particular a gas, flows upwardly, that is in the direction of the head 31 of the column 30, in the column without installations. Alternatively to this, the opposite direction can also be defined as the main direction of flow. In this case, the main direction of flow corresponds to the direction in which a less volatile fluid, that is usually a liquid, flows through the column without installations, that is in free fall in the direction of a base 32 of the column 30. In the structured packing 20, the direction of flow locally deviates from the main direction of flow since the flow is deflected by the packing layers 1 of the structured packing.

The packing layers 1 of the structured packing 20 have a corrugated section, with a plurality of open passages, the flow passages 11 (see FIG. 9) being formed by the corrugated section. The flow passages 11 comprise a first wave valley, a first wave peak and a second wave peak. The first wave peak and the second wave peak bound the first wave valley. The first wave peak and the second wave peak have a first apex and a second apex. The first wave valley has a valley bottom. At least a part of the apex can be made as an edge. At least some of the wave valleys can be made in V shape. A normal spacing between the valley base and the apex is substantially the same for all the wave peaks of the layer.

FIG. 9 shows a plurality of packing layers in accordance with the invention in accordance with a fourth embodiment. The packing layer 1 comprises a plurality of structural elements 2 and a plurality of dimples 4 which are designed and arranged such that they form a first fine structure 3 and a second fine structure 5. The first and second fine structures extend from a lower end of the packing layer 1 to an upper end of the packing layer 1 or to a side edge adjacent to the lower end or to the upper end. The structural element 2 is in this respect configured as a concave structural element 2a or as a convex structural element 2b. The dimple 4 is equally configured as a concave dimple 4a or as a convex dimple 4b. A crimp pattern 10 is superposed on the packing layers shown in FIG. 1 with the first and second fine structures 3, 5. The crimp pattern 10 has fins having a plurality of peaks and valleys, with the valleys of the crimp pattern 10 being designed as adjacent flow passages 11. The packing layers 1 are shown in the order in which they are arranged in rows or are placed onto one another and are combined to form a structured packing 20 and are inserted into a packing bed of a column 30. The packing bed as a rule comprises a plurality of structured packings 20 which are set above one another. In this respect, structured packings 20 following one another are offset about the column axis by an angle (e.g. 90°).

The invention claimed is:

1. A packing layer for a structured packing, wherein the packing layer comprises a plurality of structural elements and the structural elements are designed and arranged such that they form a first fine structure, and wherein adjacent structural elements have a first spacing, wherein the packing layer comprises a plurality of dimples which are designed and arranged such that they form a second fine structure, and wherein adjacent dimples have a second spacing, wherein the first fine structure and the second fine structure are embodied so that the spreading and distribution of a fluid over a surface of the packing layer is promoted, wherein the structural elements are designed as hole-free, and wherein at least one dimple of the plurality of dimples has a peripheral edge having at least one perforation.

2. The packing layer in accordance with claim 1, wherein the second spacing is larger than the first spacing.

3. The packing layer in accordance with claim 1, wherein the structural elements of the first fine structure are arranged along a first parallel curve group and the dimples of the second fine structure are arranged along a second parallel curve group, wherein the first curve group and the second curve group are arranged at an angle of rotation with respect to one another.

4. The packing layer in accordance with claim 1, wherein the second spacing is at least twice the size of a longitudinal dimension of one of the dimples.

5. The packing layer in accordance with claim 1, wherein a structural element is configured as a concave structural element or as a convex structural element or a dimple is configured as a concave dimple or as a convex dimple.

6. The packing layer in accordance with claim 1, wherein a crimp pattern is superposed on the first and second fine structures, and wherein the crimp pattern forms adjacent flow passages.

7. The packing layer in accordance with claim 1, wherein the packing layer comprises a plurality of cut-outs and the cut-outs are designed and arranged such that they form a third fine structure, wherein adjacent cut-outs have a third spacing.

8. The packing layer in accordance with claim 7, wherein the third spacing is larger than the first and second spacings.

9. The packing layer in accordance with claim 7, wherein the cut-outs are formed as holes.

10. A structured packing which comprises a plurality of packing layers with at least one packing layer being designed in accordance with claim 1, wherein adjacent packing layers contact one another and the flow passages of adjacent packing layers cross in an open manner.

11. A column having a plurality of structured packings which are arranged above one another and wherein at least one structured packing is designed in accordance with claim 10.

12. A method for using the packing layer of claim 1, comprising the step of carrying out a mass transfer and/or a heat transfer between a less dense fluid phase and a denser fluid phase in a mass transfer apparatus with the less dense fluid phase flowing upwardly and the denser fluid phase flowing downwardly, wherein the mass transfer apparatus contains a structured packing and this structured packing comprises the packing layer of claim 1, and wherein the denser phase flows at least partly as a film over the packing layer.

13. A packing layer for a structured packing, wherein the packing layer comprises a plurality of structural elements and the structural elements are designed and arranged such that they form a first fine structure, and wherein adjacent structural elements have a first spacing, wherein the packing layer comprises a plurality of dimples which are designed and arranged such that they form a second fine structure, and wherein adjacent dimples have a second spacing, wherein the first fine structure and the second fine structure are embodied so that the spreading and distribution of a fluid over a surface of the packing layer is promoted, wherein the structural elements and the dimples are designed as hole-free, and wherein the packing layer comprises a plurality of cut-outs and the cut-outs are designed and arranged such that they form a third fine structure, wherein adjacent cut-outs have a third spacing.

14. The packing layer in accordance with claim 13, wherein the third spacing is different from the first spacing and from the second spacing.

15. The packing layer in accordance with claim 14, wherein the third spacing is larger than the first and second spacings.

16. The packing layer in accordance with claim 13, wherein the cut-outs are formed as holes.

* * * * *